(12) United States Patent
Shimada et al.

(10) Patent No.: US 6,180,711 B1
(45) Date of Patent: Jan. 30, 2001

(54) RUBBER COMPOSITION FOR SEISMIC ISOLATION LAMINATES

(75) Inventors: Jun Shimada; Hideyuki Oishi; Takashi Shirokawa, all of Kanagawa (JP)

(73) Assignee: The Yokohama Rubber Co., Ltd., Tokyo (JP)

( * ) Notice: Under 35 U.S.C. 154(b), the term of this patent shall be extended for 0 days.

(21) Appl. No.: 09/341,958

(22) PCT Filed: Oct. 13, 1997

(86) PCT No.: PCT/JP97/03662

§ 371 Date: Jul. 21, 1999

§ 102(e) Date: Jul. 21, 1999

(87) PCT Pub. No.: WO98/32794

PCT Pub. Date: Jul. 30, 1998

(30) Foreign Application Priority Data

Jan. 22, 1997 (JP) .................................................. 9-009292

(51) Int. Cl.$^7$ ........................................................ C08K 3/04
(52) U.S. Cl. .......................... 524/495; 524/496; 524/552
(58) Field of Search .................................. 524/495, 496, 524/552; 428/500

(56) References Cited

U.S. PATENT DOCUMENTS

| | | | |
|---|---|---|---|
| 3,663,350 | * | 5/1972 | Stokes . |
| 5,182,888 | * | 2/1993 | Miyamoto et al. .............. 52/167 DF |
| 6,107,389 | * | 8/2000 | Oishi et al. .......................... 524/495 |

FOREIGN PATENT DOCUMENTS

| | | | |
|---|---|---|---|
| 10110063 | * | 4/1998 | (JP) . |
| 10110064 | * | 4/1998 | (JP) . |
| WO98/32794 | * | 7/1998 | (JP) . |

\* cited by examiner

*Primary Examiner*—Samuel A. Acquah
(74) *Attorney, Agent, or Firm*—Finnergan Henderson, Farabow, Garrett, Dunner, L.L.P.

(57) ABSTRACT

This invention relates to a rubber composition for seismic isolation laminate which exhibits excellent damping capacity as well as sufficient hardening properties. Such rubber composition for a seismic isolation laminate comprises at least a diene rubber; and 40 to 160 parts by weight of carbon black having a CTAB specific surface area of 120 to 370 (m$^2$/g) and a CTAB specific surface area (m$^2$/g)/iodine adsorption (mg/g) of up to 1.0 per 100 parts by weight of the diene rubber.

2 Claims, 2 Drawing Sheets

_US 6,180,711 B1_

RUBBER COMPOSITION FOR SEISMIC ISOLATION LAMINATES

TECHNICAL FIELD

This invention relates to a rubber composition for seismic isolation laminate which exhibits excellent damping capacity as well as sufficient hardening properties.

BACKGROUND ART

Seismic energy absorption systems, namely, seismic resistant systems, seismic resisting systems, and seismic isolation systems have recently come into widespread use, and seismic isolation rubber systems comprising alternately laminated rubber composition and rigid plates are used for bridge bearings and building base isolation. The seismic isolation rubber system is a system wherein the alternately laminated rubber composition and rigid plates exhibit reduced shear rigidity by being very hard in the vertical direction and flexible in the horizontal direction. Such seismic isolation rubber system functions to displace the vibration cycle intrinsic to the building from the seismic cycle to thereby remarkably reduce the acceleration applied to the building in the earthquake. The rubber composition used for such purpose is required to have high damping capacity so that the vibration is converted into heat to thereby damp the seismic energy.

In conventional rubber compositions, such high damping capacity has been realized by increasing the amount of carbon black blended or by blending a resin component. However, it has been difficult to simultaneously realize the high damping capacity and other physical properties required, and such attempt has been associated with the problem of hardening.

The present invention has been completed in view of the situation as described above, and an object of the present invention is to provide a rubber composition which offers the high damping capacity wherever it is used.

SUMMARY OF THE INVENTION

The inventors of the present invention have made an intensive study to solve the problems as described above, and found that a high damping capacity can be realized without adversely affecting other essential properties and the hardening properties can be simultaneously improved if a carbon black having predetermined carbon black properties is blended in the rubber composition. The present invention has been completed on the bases of such finding.

Furthermore, the inventors of the present invention have found that the relation between the damping capacity and the particle size and the amount blended of the carbon black required for realizing the desired high damping capacity can be represented by a certain expression. Production of a preferable rubber composition was then enabled by limiting the amount of the carbon black blended on the bases of the value calculated by such equation.

According to the present invention, there is provided a rubber composition for a seismic isolation laminate comprising at least a diene rubber; and 40 to 160 parts by weight of carbon black having a CTAB specific surface area of 120 to 370 (m²/g) and a CTAB specific surface area (m²/g)/ iodine adsorption (mg/g) of up to 1.0 per 100 parts by weight of the diene rubber.

The rubber composition is preferably a rubber composition for a seismic isolation laminate characterized in that the rubber composition has a CF value in the range of 2.4 to 10.5 when the CF value is calculated by the following formula (1):

$$CF = \frac{(Dst)^{1.1} \times (24M4DBP \text{ oil absorption number})^{0.4}}{(\text{volume fraction of carbon black in the rubber composition})^3 \times 10^4}$$

wherein Dst is Stokes equivalent diameter (nm) of carbon black aggregates of the maximum frequency in centrifugal precipitation; 24M4DBP oil absorption number (dibutyl phthalate absorption number of compressed sample) (ml/100 g) represent the degree of primary structure development of the carbon black; and the carbon volume fraction in the rubber composition is (volume of the carbon)/(volume of the rubber composition).

PREFERRED EMBODIMENTS FOR CARRYING OUT THE INVENTION

Figure 1:
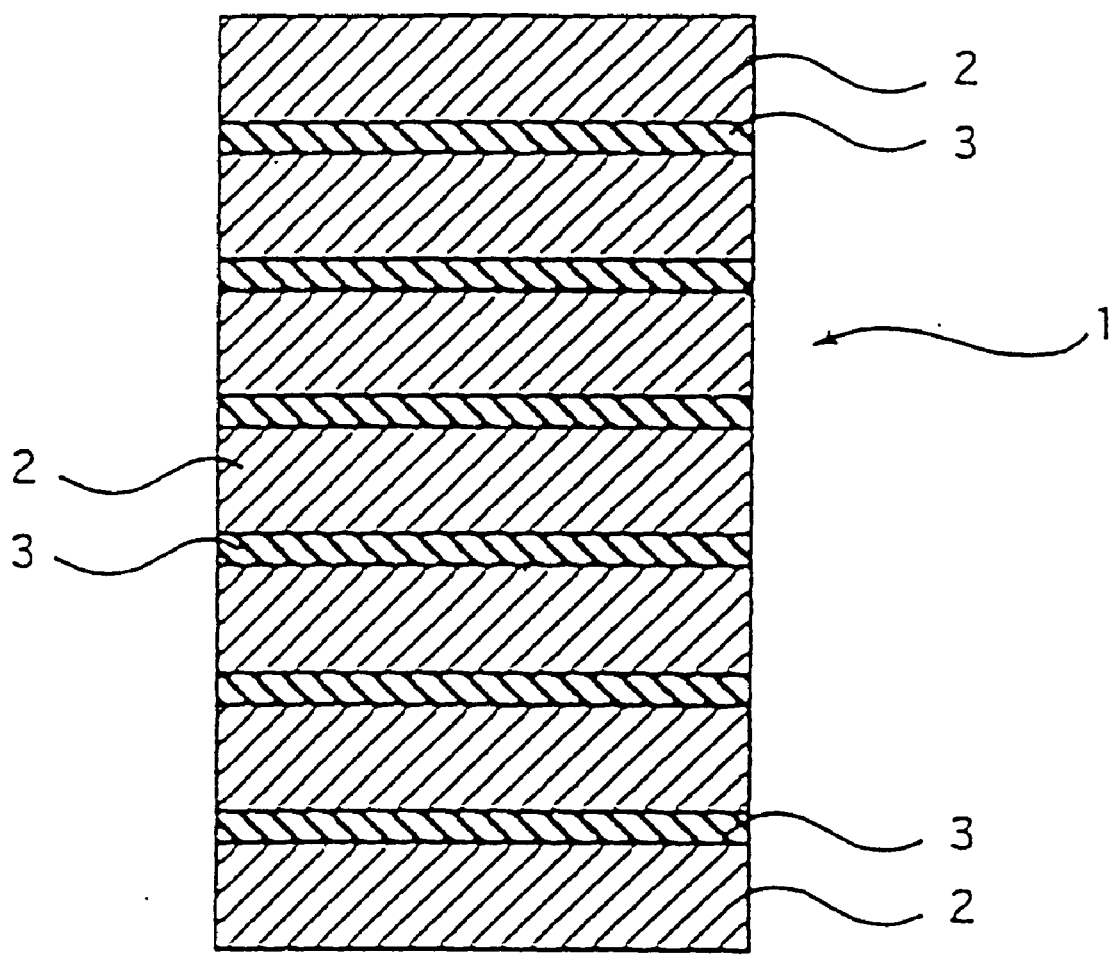
FIG. 1 is a view of an embodiment of a seismic isolation laminate wherein the rubber composition for seismic isolation laminate of the present invention is employed.

The present invention is hereinafter described in further detail.

The rubber composition of the present invention comprises a rubber matrix having uniformly dispersed therein a predetermined amount of the carbon black.

Such rubber composition is produced by blending the carbon black, a vulcanizing agent, and other additive materials in unvulcanized rubber to prepare an unvulcanized compound; and then, shaping the compound into the desired shape and heating and vulcanizing the shaped compound.

The components used are as described below.

Diene Rubber

The unvulcanized rubbers which may be used in the preparation of the present composition include natural rubber (NR), isoprene rubber (IR), butadiene rubber (BR), styrene-butadiene copolymer rubber (SBR), acrylonitrile-butadiene copolymer rubber (NBR), butyl rubber (IIR), halogenated butyl rubber (Br-IIR, Cl-IIR), chloroprene rubber (CR), and the like. Among these, the preferred are NR and IR in view of the good balance between damping capacity and workability. It is also possible to use two or more diene rubbers in combination.

Carbon Black

The rubber composition of the present invention has blended therein a carbon black having particular properties.

The carbon black used in the rubber composition of the present invention has a CTAB specific surface area of 120 to 370 (m²/g), preferably 120 to 220 (m²/g), more preferably 130 to 200 (m²/g), and most preferably 130 to 185 (m²/g); and a CTAB specific surface area (m²/g)/iodine adsorption (hereinafter abbreviated as IA) (mg/g) of up to 1.0, preferably up to 0.95, and most preferably 0.5 to 0.9.

These parameters represent colloidal properties of the carbon black particles. CTAB specific surface area is indicative of the specific surface area of the carbon black, and CTAB/IA indicates surface activity of the carbon black. The present invention is characterized by the use of the fine particle carbon black wherein the parameters meet the conditions as described above. Use of such fine particle carbon black has enabled to provide the rubber composition with a high damping capacity which could not be realized with the carbon black used in conventional rubber compositions (which has colloidal properties different from the carbon black used in the present invention, and which has a larger particle diameter and higher surface activity).

Such carbon black is blended in the rubber composition in an amount of 40 to 160 parts by weight, preferably 50 to 140 parts by weight, and most preferably 60 to 130 parts by weight per 100 parts by weight of unvulcanized diene rubber. The carbon black used in the present invention is critical for the development of the energy absorption capacity of the rubber composition of the present invention. When the amount of the carbon black blended is less than 40 parts by weight, the resulting rubber composition will suffer from insufficient absorption capacity of the vibration energy. Amount of the carbon black in excess of 160 parts by weight is unfavorable for the production of the rubber composition due to the reduced workability of the rubber composition during its production, and the resulting rubber composition will suffer from insufficient strength.

The inventors of the present invention has further found out that the relation between the damping capacity and the particle size and the amount blended of the carbon black required for realizing the desired high damping capacity can be represented by the following expression (1). In other words, in the present invention, the carbon black is preferably blended in the rubber composition so that the relation represented by the following expression (1) is fulfilled. The value of CF calculated by the following expression (1) is a value which has a correlation with damping properties, and CF is in the range of 2.4 to 10.5, preferably 2.5 to 10.5, and most preferably 3.0 to 9.5.

$$CF = \frac{(Dst)^{1.1} \times (24M4DBP \text{ oil absorption number})^{0.4}}{(\text{volume fraction of carbon black in the rubber composition})^3 \times 10^4} \quad (1)$$

In the expression, Dst is Stokes equivalent diameter (nm) of carbon black aggregates of the maximum frequency in centrifugal precipitation; 24M4DBP oil absorption number (dibutyl phthalate absorption number of compressed sample) (ml/100 g) represents the degree of primary structure development of the carbon black; and the carbon volume fraction in the rubber composition is (volume of the carbon)/(volume of the rubber composition).

The carbon black properties as described above were evaluated by the procedure as described below.

CTAB Specific Surface Area

The CTAB specific surface area was measured in accordance with ASTM-D3765-80.

Iodine Adsorption

The iodine adsorption was measured in accordance with JIS K-6221.

24M4DBP Oil Absorption Number

The 24M4DBP oil absorption number was measured in accordance with ASTM-D3493.

Dst

Dried carbon black sample was mixed with a 20% aqueous solution of ethanol containing a minute amount of a surfactant to prepare a dispersion solution having a carbon black concentration of 5 mg/100 cc, which was sufficiently dispersed by ultrasonic wave irradiation to provide a testing sample. A disc centrifuge device (a product of Joiceloebl, the United Kingdom) was set to rotate at a rotation velocity of 8000 rpm, and 10 ml of spin liquid (distilled water), and then, 0.5 ml of buffer solution (an aqueous ethanol solution) was added. Using a syringe, 0.5 ml of the testing sample was supplied, and a centrifugal classification was initiated. At the same time, a recorder was put into operation to optically obtain a curve of the aggregate equivalent Stokes diameter distribution. The Stokes equivalent diameter (nm) of the maximum frequency on the distribution curve was taken as the Dst.

Volume Fraction of Carbon Black

The volume fraction of the carbon black is calculated from the proportion of the carbon black blended when the composition is known. When the composition is unknown, the volume fraction of the carbon black is calculated from carbon black content analyzed. For the analysis of the carbon black content, the rubber and the organic additives are decomposed at 800 to 900° C. in nitrogen stream to leave the inorganic component and the carbon black, and the carbon volume is calculated from the carbon black weight by using the specific weight in air of the carbon black which is 1.82. The thus obtained carbon volume is divided by the volume of the rubber composition to thereby obtain the volume fraction of the carbon black.

By blending the carbon black to meet the expression (1), the resulting rubber composition will be provided with improved damping properties and hardening properties.

It should be noted that the expression (1) as described above is a novel expression, and there is no prior art wherein the carbon black blended in the rubber composition is defined by such expression.

Optional Components

In the production of the vulcanized rubber composition of the present invention, the unvulcanized rubber may have added thereto various optional components in addition to the critical components as described above. Examples of such optional components include vulcanizing agent such as sulfur, vulcanization aid such as CBS, and anti-aging agent.

The unvulcanized rubber may also have added thereto an optional resin. The resin blended is not particularly limited, and exemplary resins include petroleum resin, natural resins, and rosin resins.

Exemplary petroleum resins include coumarone plastic produced by copolymerizing coumarone, indene and styrene in solvent naphtha; and resins produced by polymerizing non-isolated di-olefin and mono-olefin components of a cracked oil fraction produced as a byproduct in steam cracking of petroleum or the like in an ethylene plant where ethylene, propylene and the like are produced.

Exemplary natural resins include animal natural resins such as shellac, vegetable natural rubber resins such as gum arabic, vegetable natural resins such as dimers, east India, and copal, natural hydrocarbon resins, accroides, elemi, mastic, sandarac, tragacanth gum, Japanese lacquer, rosin, and the like.

Exemplary rosin resins include rosin modified alkyd resins produced by copolymerizing the rosin resin with an alkyd resin.

After blending such additives in the unvulcanized rubber composition, the composition is shaped by an adequate means, and vulcanized at a temperature of 130 to 170° C. by a known means in a known apparatus to obtain the vulcanized rubber composition.

FIG. 1 shows an embodiment of a seismic isolation laminate 1 prepared by using the rubber composition of the present invention. The seismic isolation laminate 1 comprises alternately disposed rubber composition of the present invention 2 and a rigid plate 3 such as a steel plate for general structural use or a cold rolled steel plate. For producing the seismic isolation laminate 1, a sheet-form rubber composition 2 is first produced by shaping and vulcanizing the rubber composition, and the thus produced sheet-form rubber composition 2 is then adhered to the rigid plate 3 by using an adhesive. Alternatively, the seismic isolation laminate 1 may be produced by forming sheet-form unvulcanized rubber composition, laminating the rubber sheets and the rigid plates 3, and thereafter heating the laminate for simultaneous vulcanization and adhesion.

The thus produced seismic isolation laminate can be adequately used for such applications as bearing of road bridges and base isolation of buildings.

EXAMPLES

Next, the present invention is described in further detail by referring to the Examples.

Examples 1 to 7 and Comparative Examples 1 to 10

Unvulcanized rubber compositions were prepared by blending the natural rubber and various carbon black of the proportion as shown in Tables 2 and 3; 5 parts by weight of aromatic oil; 40 parts by weight of the resin; 5 parts by weight of zinc white; 1 part by weight of stearic acid; 1.5 parts by weight of sulfur; 1.0 part by weight of CBS as vulcanization aid per 100 parts by weight of the rubber content.

The rubber components and the additives except for the vulcanization aid (CBS) and the sulfur were mixed in a Bambury mixer (Model B, manufactured by Kobe Steel, Ltd., 1.8 L) for 5 minutes. The vulcanization aid and the sulfur were added to this mixture and the mixture was kneaded in an 8-inch laboratory roll mill for 4 minutes to obtain the rubber composition.

The contents of various components shown in Tables 2 and 3 are in parts by weight. The properties of the carbon blacks used in Examples and the Comparative Examples are shown in Table 1.

TABLE 1

|  | CB1 | CB2 | CB3 | CB4 | CB5 | CB6 | CB7 | CB8 | CB9 |
|---|---|---|---|---|---|---|---|---|---|
| CTAB (m$^2$/g) | 82 | 118 | 250 | 140 | 139 | 147 | 147 | 147 | 220 |
| CTAB/IA | 1.11 | 1.02 | 0.74 | 1.03 | 0.88 | 1.01 | 0.97 | 0.89 | 0.92 |
| 24M4DBP (ml/100 g) | 69 | 93 | 94 | 102 | 107 | 103 | 101 | 102 | 98 |
| Dst (nm) | 109 | 92 | 54 | 51 | 60 | 61 | 61 | 56 | 54 |

Of the carbon blacks used, CB3, 5, 7, 8 and 9 are those within the scope of the present invention. CB1 and CB2 has both the CTAB and the CTAB/IA outside the scope of the present invention, and CB4 and CB6 has a CTAB/IA which does not fulfill the requirements of the present invention.

The carbon blacks used were:

CB1: DIA HA (manufactured by Mitsubishi Chemical)

CB2: Shoblack N220 (manufactured by Showa Cabbot)

CB3: Raven 3200 (manufactured by Columbian Chemicals Company)

CB4: Test Carbon T1

CB5: Test Carbon T2

CB6: Test Carbon T3

CB7: Test Carbon T4

CB8: Test Carbon T5

CB9: Test Carbon T6

TABLE 2

| | Comparative Example 1 | Comparative Example 2 | Example 1 | Comparative Example 3 | Example 2 | Comparative Example 4 | Example 3 | Example 4 | Example 5 |
|---|---|---|---|---|---|---|---|---|---|
| Components | | | | | | | | | |
| Natural Rubber | 100 | 100 | 100 | 100 | 100 | 100 | 100 | 100 | 100 |
| Carbon Black | | | | | | | | | |
| Type | CB1 | CB2 | CB3 | CB4 | CB5 | CB6 | CB7 | CB8 | CB9 |
| Amount | 70 | 70 | 70 | 70 | 70 | 70 | 70 | 70 | 70 |
| Aromatic Oil | 5 | 5 | 5 | 5 | 5 | 5 | 5 | 5 | 5 |
| Resin | 40 | 40 | 40 | 40 | 40 | 40 | 40 | 40 | 40 |
| Zinc White | 5 | 5 | 5 | 5 | 5 | 5 | 5 | 5 | 5 |
| Stearic Acid | 1 | 1 | 1 | 1 | 1 | 1 | 1 | 1 | 1 |
| CBS | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 |
| CF Value | 12.8 | 10.8 | 6.06 | 5.88 | 7.17 | 7.19 | 7.13 | 6.52 | 6.16 |
| Physical Properties | | | | | | | | | |
| Rubber Properties Kneading Adaptability | ◎ | ◎ | Δ | ○ | ○ | ○ | ○ | ○ | ○~Δ |
| Tensile test | | | | | | | | | |
| Modulus | 1.83 | 1.86 | 1.17 | 1.86 | 1.81 | 1.70 | 1.69 | 1.55 | 1.41 |
| Hysteresis loss | 40.1 | 43.0 | 47.3 | 45.9 | 46.0 | 45.0 | 45.9 | 46.1 | 47.2 |
| Hardening | 1.14 | 1.10 | 0.90 | 1.11 | 1.06 | 1.10 | 1.05 | 1.00 | 0.98 |
| General Physical Properties | | | | | | | | | |
| M200 | 43 | 42 | 22 | 43 | 42 | 40 | 38 | 36 | 33 |
| TB | 225 | 230 | 198 | 260 | 259 | 257 | 251 | 251 | 237 |
| EB | 735 | 755 | 815 | 745 | 755 | 795 | 800 | 825 | 805 |
| HS | 68 | 69 | 75 | 76 | 76 | 74 | 74 | 75 | 75 |

TABLE 3

| | Comparative Example 5 | Comparative Example 6 | Comparative Example 7 | Comparative Example 8 | Example 6 | Comparative Example 9 | Example 7 | Comparative Example 10 |
|---|---|---|---|---|---|---|---|---|
| Components | | | | | | | | |
| Natural rubber | 100 | 100 | 100 | 100 | 100 | 100 | 100 | 100 |
| Carbon Black | | | | | | | | |
| Type | CB2 | CB1 | CB1 | CB1 | CB7 | CB7 | CB7 | CB7 |
| Amount | 70 | 70 | 80 | 80 | 70 | 55 | 60 | 115 |
| Aromatic Oil | 5 | 5 | 5 | 15 | 5 | 5 | 5 | 5 |
| Resin | 40 | 40 | 40 | 40 | 40 | 40 | 40 | 40 |
| Zinc White | 5 | 5 | 5 | 5 | 5 | 5 | 5 | 5 |
| Stearic acid | 1 | 1 | 1 | 1 | 1 | 1 | 1 | 1 |
| CZ | 1 | 1 | 1 | 1 | 1 | 1 | 1 | 1 |
| Sulfur | 1.5 | 1.5 | 1.5 | 1.5 | 1.5 | 1.5 | 1.5 | 1.5 |
| CF Value | 12.8 | 12.8 | 9.3 | 10.9 | 7.17 | 12.9 | 10.4 | 2.3 |
| Physical Properties | | | | | | | | |
| Rubber Properties Kneading Adaptability | ◎ | ◎ | ○ | ○ | ○ | ◎ | ○ | Δ~× |
| Tensile test | | | | | | | | |
| Modulus | 1.86 | 1.85 | 2.11 | 1.57 | 1.69 | 1.20 | 1.29 | 3.29 |
| Hysteresis loss | 43.0 | 40.1 | 43.1 | 42.8 | 45.9 | 42.8 | 43.2 | 53.5 |
| Hardening | 1.10 | 1.14 | 1.22 | 1.13 | 1.05 | 1.02 | 1.03 | 1.10 |
| General Physical Properties | | | | | | | | |
| M200 | 42 | 43 | 56 | 40 | 38 | 30 | 33 | 67 |
| TB | 230 | 225 | 251 | 228 | 251 | 272 | 267 | 141 |
| EB | 755 | 735 | 695 | 780 | 800 | 845 | 820 | 415 |
| HS | 69 | 68 | 69 | 66 | 74 | 68 | 71 | 92 |

The components indicated in the Tables are as described below.

Natural rubber: TSR20

Aromatic oil: Dianaprocess AH-20 (manufactured by Idemitsu Kosan Co., Ltd.)

Resin: Escrone V120 (coumarone indene resin manufactured by Nippon Steel Chemical)

Zinc white: Zinc White No. 3 (manufactured by Shodo Chemical)

Stearic acid: LUNAC YA (manufactured by Kao Soap Co., Ltd.)

CBS: Noxeler cz (manufactured by Ohuchi Shinko Chemical)

Sulfur: powder sulfur (manufactured by Karuizawa Seirensho)

The rubber compositions were evaluated as described below. The kneading adaptability was evaluated by checking the kneading adaptability in the course of the preparation of the unvulcanized rubber in the Model B Banbury mixer. The rubber physical properties were evaluated for the vulcanized products obtained by press vulcanizing the rubber compositions produced in the Examples and the Comparative Examples in the vulcanizing press machine defined in JIS K6301 at 148° C. for 45 minutes. The vulcanized products were evaluated as described below.

(1) Kneading Adaptability

Carbon black incorporation into the rubber composition in the course of the kneading and integrality of the rubber composition after the kneading were mainly monitored. The results were totally evaluated according to the four criteria: ⊚, ○, Δ, and X.

(2) Properties Evaluated by Tensile Test

Rectangular samples having a width of 10 mm and a thickness of 2 mm were evaluated on an Autograph tensile tester by stretching the sample for 5 times to 150% under the conditions including a crosshead speed of 500 mm, and evaluating the properties for the fifth stretching.

(a) Modulus

Modulus (MPa) at 150% elongation was measured.

(b) Hysteresis loss

Energy damping was evaluated (The value calculated by $h_{eq}=(\Delta ABCDEA/\Delta ABCFA)\times 100$ was compared).

(c) Hardening

Figure 2:
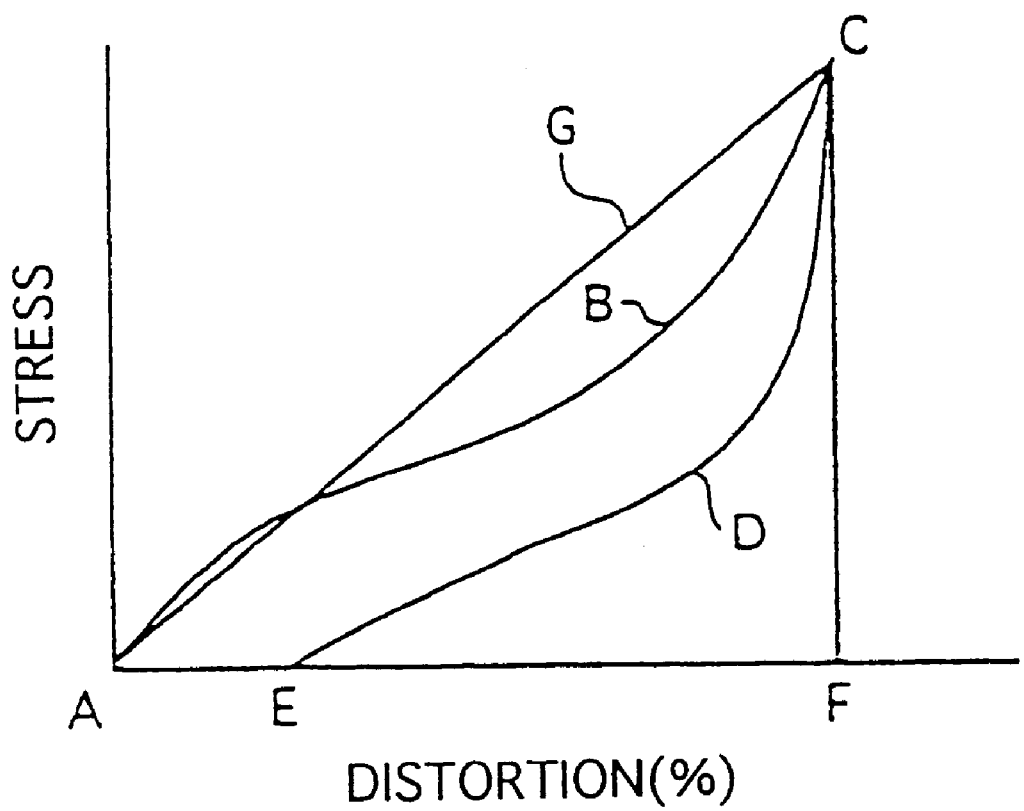
FIG. 2 is a graph showing the stress-strain curve in the tensile test on an autograph.

Non-linearness of the stress to the rubber deformation was evaluated (The value calculated by hardening $=\Delta AGCFA/\Delta ABCFA$ in FIG. 2 was compared). A larger value corresponds to the stronger non-linearness unsuitable for a bearing rubber.

FIG. 2 is a stress-strain curve.

(3) General Physical Properties (d) Tensile modulus ($M_{200}$)

Tensile modulus (MPa) at 200% elongation was measured in accordance with JIS K 6301.

(e) Tensile strength ($T_B$)

Tensile strength was measured in accordance with JIS K 6301. A larger value corresponds to a higher resistance to breakage.

(f) Elongation ($E_B$)

Elongation was measured in accordance with JIS K 6301. A larger value corresponds to a larger elongation.

(g) JIS A hardness ($H_S$)

Hardness was measured in accordance with JIS K 6301. A larger value corresponds to a higher hardness.

In the evaluation described in Table 2, the hysteresis loss and the hardening were compared by using the hysteresis loss and the hardening of Comparative Example 2 for the reference. Comparative Examples 1 and 2 exhibited unfavorably low hysteresis loss due to the carbon black content of less than 120. Comparative Examples 3 and 4 having the CTAB within the scope of the present invention exhibited unsuitable hardening properties due to the CTAB/IA in excess of 1.0.

Table 3 shows the results of comparison of the relation between the physical properties of the rubber composition and the CF value by using the results of Comparative Example 5 for the reference. Comparative Example 7 prepared by changing the amount of carbon black of Comparative Example 6 exhibited a CF value within the scope of the present invention, and Comparative Example 7 exhibited a hysteresis loss of preferable range. Comparative Example 7, however, exhibited a low elongation ($E_B$) to indicate insufficient breakage properties. Comparative Example 8 whose CF value was within the scope of the present invention exhibited an insufficient hysteresis loss. As demonstrated above, the rubber composition prepared by using a carbon black whose properties are outside the scope of the present invention exhibits insufficient properties even if the CF value was within the predetermined range.

Examples 6 and 7 and Comparative Examples 9 and 10 were prepared by using a carbon black having a CTAB value and a CTAB/IA value within the scope of the present invention. Comparative Example 9 had a low hysteresis loss and failed to exhibit sufficient performance due to the CF value in excess of the range of the present invention. Comparative Example 10 had a CF value below the range of the present invention, and kneading adaptability was insufficient.

INDUSTRIAL UTILITY

The rubber composition for a seismic isolation laminate of the present invention is prepared by using the carbon black of particular properties, and as a consequence, the rubber composition offers excellent damping capacity and hardening properties which can never be realized by blending an ordinary carbon black. Therefore, the rubber composition of the present invention is highly adapted for use in various seismic energy absorbing systems including seismic isolation systems, seismic resisting systems and seismic resistant systems (for use in the seismic isolation of a bridge, a building or a house).

What is claimed is:

1. A rubber composition for a seismic isolation laminate comprising at least a diene rubber; and 40 to 160 parts by weight of carbon black having a CTAB specific surface area of 120 to 370 (m²/g) and a CTAB specific surface area (m²/g)/iodine adsorption (mg/g) of up to 1.0 per 100 parts by weight of the diene rubber.

2. A rubber composition for a seismic isolation laminate according to claim 1 characterized in that the rubber composition has a CF value in the range of 2.4 to 10.5 when the CF value is calculated by the following formula (1):

$$CF = \frac{(Dst)^{1.1} \times (24M4DBP \text{ oil absorption number})^{0.4}}{(\text{volume fraction of carbon black in the rubber composition})^3 \times 10^4}$$

wherein Dst is Stokes equivalent diameter (nm) of carbon black aggregates of the maximum frequency in centrifugal precipitation; 24M4DBP oil absorption number (dibutyl phthalate absorption number of compressed sample) (ml/100 g) represents the degree of primary structure development of the carbon black; and the carbon volume fraction in the rubber composition is (volume of the carbon)/(volume of the rubber composition).

* * * * *